(12) United States Patent
Kempner

(10) Patent No.: US 10,898,013 B2
(45) Date of Patent: Jan. 26, 2021

(54) JEWELRY STORAGE AND DISPLAY ORGANIZER

(71) Applicant: Caralyn Kempner, Northbrook, IL (US)

(72) Inventor: Caralyn Kempner, Northbrook, IL (US)

( * ) Notice: Subject to any disclaimer, the term of this patent is extended or adjusted under 35 U.S.C. 154(b) by 0 days.

(21) Appl. No.: 16/112,676

(22) Filed: Aug. 25, 2018

(65) Prior Publication Data

US 2020/0060443 A1   Feb. 27, 2020

(51) Int. Cl.
*A47F 7/02* (2006.01)
*A45C 11/16* (2006.01)
*F16B 1/00* (2006.01)

(52) U.S. Cl.
CPC ............... *A47F 7/02* (2013.01); *A45C 11/16* (2013.01); *F16B 2001/0035* (2013.01)

(58) Field of Classification Search
CPC . A47F 1/12; A47F 5/0807; A47F 7/02; A45C 11/16; F16B 2001/0035
USPC ....................................................... 211/85.2
See application file for complete search history.

(56) References Cited

U.S. PATENT DOCUMENTS

| | | | | |
|---|---|---|---|---|
| D24,680 S | * | 9/1895 | Davison | D6/680 |
| D210,921 S | * | 4/1968 | Downs | D6/674 |
| D242,670 S | | 12/1976 | Northup | |
| 4,264,018 A | | 4/1981 | Vollmer | |
| 4,687,103 A | | 8/1987 | Corbett | |
| 4,720,012 A | | 1/1988 | Dufour | |
| 4,811,996 A | | 3/1989 | Hansson | |
| 4,944,389 A | * | 7/1990 | Robertson | A47F 7/02 206/477 |
| D317,095 S | | 5/1991 | Albers | |
| 5,067,617 A | | 11/1991 | Caldwell et al. | |
| 5,087,105 A | | 2/1992 | White | |
| 5,197,596 A | * | 3/1993 | Garganese | A47F 7/02 206/486 |
| 5,261,529 A | | 11/1993 | Holland | |
| 5,377,820 A | * | 1/1995 | Christman | A47F 5/0807 206/495 |
| 5,433,643 A | * | 7/1995 | Pratt | A63H 3/003 446/268 |
| 5,671,849 A | | 9/1997 | Bacon | |
| 5,950,815 A | | 9/1999 | Yetman-Bellows | |
| 7,008,029 B1 | | 3/2006 | Aclin | |

(Continued)

OTHER PUBLICATIONS https://www.merriam-webster.com/dictionary/grommet on Jun. 16, 2019.

(Continued)

*Primary Examiner* — Patrick D Hawn
(74) *Attorney, Agent, or Firm* — Pioneer Patent, LLC; Shannon L. Nebolsky

(57) ABSTRACT

Disclosed is a jewelry holding device for storing and displaying earrings, necklaces, bracelets, and other items of jewelry. The jewelry holder has a base from which extends a stem which supports a cover. The cover has one or more openings for storing and displaying piercing jewelry. The base of the jewelry holder is capable of releasable attachment to a storage support. The device stem optionally accommodates holding other items of jewelry such as necklaces, cuffs and bracelets. Also disclosed is a method for displaying and organizing jewelry using such a device.

6 Claims, 7 Drawing Sheets

(56) References Cited

U.S. PATENT DOCUMENTS

| | | | |
|---|---|---|---|
| 7,510,092 B2 | 3/2009 | Sholem | |
| 7,757,844 B2 * | 7/2010 | Mobley | A45C 11/16 |
| | | | 206/566 |
| 8,151,980 B2 | 4/2012 | DeMartino | |
| 8,800,789 B2 | 8/2014 | Sharp | |
| 8,998,006 B2 | 4/2015 | Taurins | |
| 9,131,789 B1 * | 9/2015 | Williams | A47F 7/02 |
| 9,339,137 B2 * | 5/2016 | Nelson | A47G 29/08 |
| 9,723,904 B1 | 8/2017 | Taylor | |
| 9,814,328 B2 | 11/2017 | Martino et al. | |
| 2006/0086681 A1 * | 4/2006 | Buechin | G09F 1/10 |
| | | | 211/85.31 |
| 2009/0194650 A1 * | 8/2009 | Corvo | A47G 1/02 |
| | | | 248/205.3 |
| 2010/0163696 A1 * | 7/2010 | Briggs | A47B 96/061 |
| | | | 248/206.5 |
| 2010/0276382 A1 * | 11/2010 | Antonioni | A47F 5/0807 |
| | | | 211/59.2 |
| 2014/0263116 A1 * | 9/2014 | Wojciechowski | A47F 5/0807 |
| | | | 211/85.2 |

OTHER PUBLICATIONS https://www.collinsdictionary.com/dictionary/english/grommet on Jun. 16, 2019.

\* cited by examiner

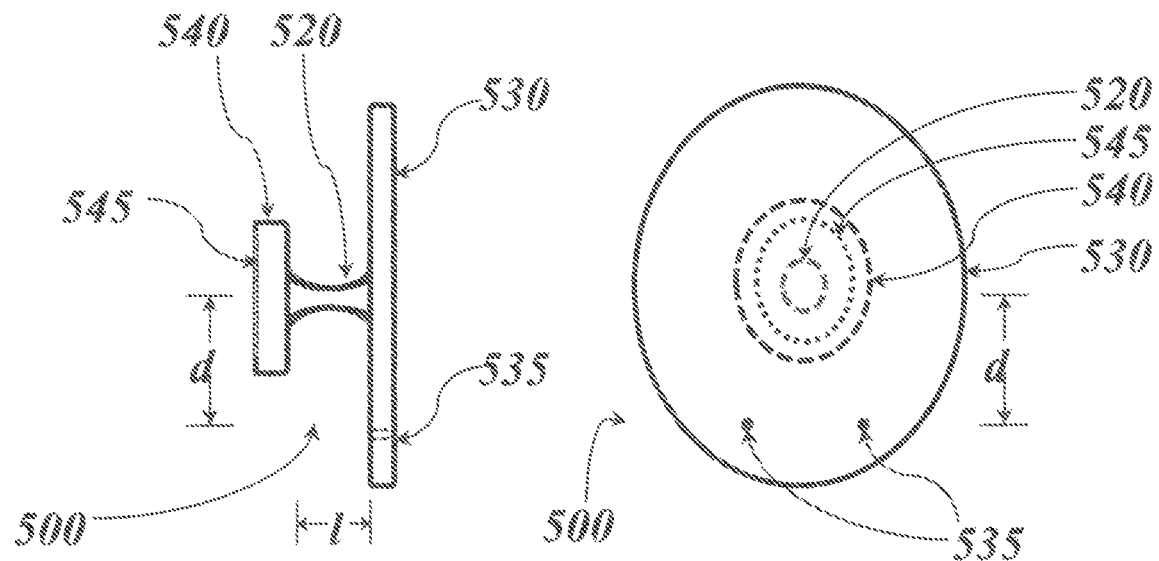
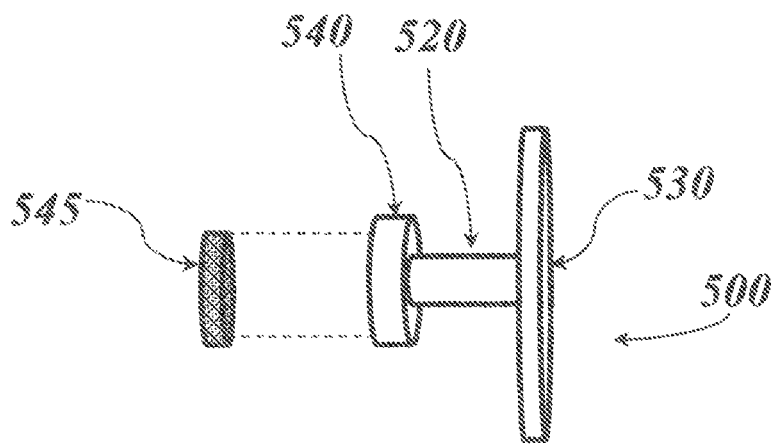

JEWELRY STORAGE AND DISPLAY ORGANIZER

FIELD OF THE INVENTION

This invention generally relates to devices for the storage and display of jewelry, and more particularly to a device for storing piercing jewelry such that the jewelry is easily visible and easily accessible, and optionally capable of storing and displaying other types of jewelry on the same device.

BACKGROUND OF THE INVENTION

Home jewelry storage devices of the art typically include drawers or bins in which to place pieces of jewelry. In order to clearly display and prevent mounding up of jewelry, the art provides numerous devices and methods for storing jewelry that tends to be tailored to the type of jewelry. Jewelry owners may have sizable quantities of various types of jewelry, but due to streamlining the dressing process, tend to wear the same pieces to avoid the time it takes to look over the collection and select different pieces each day. Also troublesome is picking through and accessing jewelry pieces, in particular piercing jewelry. Many storage organizing devices require removal of the jewelry backing to remove the jewelry piece from storage, and such manipulation can be difficult.

Storage and display of piercing jewelry presents a difficulty in part because piercing jewelry can be many forms, including post, wire, clip, hoop and gauge. Further, ear jewelry can also include cuffs or wraps. Jewelry pieces may connect together, such as a cuff to a stud. Storage for piercing jewelry, for example earrings for pierced ears, is often on a storage device where the portion of the piercing jewelry which would pass through the wearer when worn, in storage instead passes through the storage device. Further, many owners store their piercing jewelry with the backings on, to prevent loss of either piece. Removal of the backing of the stored jewelry to remove the piercing jewelry from the holder can be difficult to access.

Jewelry holders of the art often provide for holding multiple pieces of jewelry, for example rack-type earring holders with rows of apertures to display multiple pairs in rows, or alternatively, sheet-type earring holders with large flat areas of mesh openings or grid of apertures. A drawback of many holders for piercing jewelry, such as post-type earrings with backings, is awkward access to both the front and back of the earring holder at the same time, as required for removal of the backing to release the stored earring. A further drawback of many jewelry holders is that physical access to one jewelry piece for removal from the display device causes large amounts of jewelry to be jostled and possible knocked off. Similarly, a rack with many different jewelry pieces can be cluttered and pieces interfere with one another when trying to view or access them for displaying, storage or removal.

It is therefore an object of the present invention to provide an improved device for the storage and display of jewelry. An object is to provide such a device in the form of an improved jewelry storage device so that the jewelry is easily accessible. A related object is that the device provides clear display of the jewelry.

Another objective of the invention is that the device permits easy retrieval of the articles of jewelry. In particular, removable attachment of a jewelry holder from its support according to the invention allows easy access and manipulation of earrings stored thereupon, particularly in the case of earrings for pierced ears.

A further object of the present invention is to provide an improved jewelry storage and display device which facilitates the display of multiple pieces of jewelry at one time. A related object is that the invention permits grouping of stored jewelry. A related object is the display of selected combinations of items of jewelry. An optional related object of the present invention is to provide a jewelry storage device adapted to permit simultaneous storage of various types of jewelry.

Yet another object of the present invention is to provide an improved jewelry storage device that permits interchangeable storage and display of many different styles of jewelry. A related object is storage of different types of piercing jewelry.

SUMMARY OF THE INVENTION

The above objects are met or exceeded by the provided jewelry storage device. The jewelry storage device has a base from which extends a stem which supports a cover. The cover has a plurality of openings for storing and displaying piercing jewelry. The base of the jewelry holder is capable of removable attachment to a display support. The device stem is of a length, l, that at minimum accommodates the space required for the backings of the stored piercing jewelry when placed through the opening, and preferably permits easy access for removal of a jewelry backing piece. In some embodiments, a disclosed device additionally accommodates holding other items of jewelry such as necklaces, cuffs and bracelets. Also disclosed is a method for displaying and organizing jewelry using such a device.

BRIEF DESCRIPTION OF THE DRAWINGS

FIG. 1 is a magnetic variation of a jewelry storage device 500 according to the invention. FIG. 1A is a transparent side view. FIG. 1B is a transparent top view. FIG. 1C is an exploded view.

FIG. 2 is a jewelry storage device according to the invention.

FIG. 3 is elevational views of three examples of insertable variations of jewelry storage devices 500 according to the invention where the removable attachment of the base is insertion of a base protrusion into a complementary receptacle housed within a rack-style storage support 200.

FIG. 4 is elevational views of an insertable variation of a jewelry storage device according to the invention showing five removable jewelry storage devices 500 inserted into a storage supports 200.

FIG. 5 is elevational views of an insertable variation of a jewelry storage device according to the invention.

FIG. 6 shows floral variation examples of a removable jewelry storage device according to the invention.

FIG. 7 is elevational views of a hook variation of a removable jewelry storage device according to the invention as used with a rack storage support 200.

DESCRIPTION

Figure 2A:
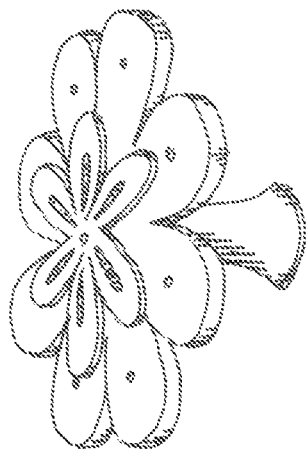
FIG. 2A is an elevational side front view of a floral variation.

The primary objective of the present invention is a device for storage and display of piercing jewelry that is easily accessible and easily retrieved from the storage device. The present invention reaches the primary objective through having the storage and display device capable of removable attachment to a storage support, and by having appropriate dimensions. Piercing jewelry contemplated for use with a storage device according to the present invention includes, but is not limited to, wire supported earrings, post-supported earrings, hoop-type earrings, stud-type piercing jewelry (including those for any body part including but not limited to eyebrow, nose, lip, belly-button) and gauge-type piercing jewelry.

The invention contemplates a jewelry storage device for removable attachment to a storage support for the storage and display of jewelry. Such jewelry storage device can be considered to have a base, a stem and a cover. The base has a back side portion and a stem side portion, where the stem is attached to or extends from the stem side of the base. The base provides a means for removable attachment to a storage support. The stem of the jewelry storage device is generally cylindrical having a rear end and a face end. The stem extends from the stem side of the base. The stem has a length of at least 0.5 cm. The rear end of the stem connects to the base and the other end of the stem is the face end which connects to the cover. The stem is oriented in a manner to extend generally away from storage support, thus typically away from the base. The primary purpose to be to maintain ease of accessibility to the jewelry storage device in taking the jewelry on and off the storage support, while also preventing the base or means for removable attachment from interfering with easy access to the piercing jewelry stored on the cover. The cover is a generally planar cover. The cover attaches to or extends from the face end of the stem. For mounting the piercing jewelry, the cover has at least two openings which pass all of the way through the cover. Preferably, when the cover is considered generally planar, the openings pass through that plane. The opening of the opening admits the portion of the piercing jewelry that would typically pass through the body part when worn, thus has an area of at least about 1 square mm. In a set of contemplated embodiments, the back side of the base of a contemplated jewelry storage device is generally planar. In a subset of contemplated embodiments, the jewelry storage device stem has a length of about 1 cm to about 5 cm. In a subset of contemplated embodiments, the cover of a jewelry storage device has two through ten openings.

In another set of contemplated embodiments, the invention contemplates use with a storage support. In a subset of those embodiments, the storage support is generally planar and contains a ferromagnetic element so that the corresponding means for removable attachment of contemplated jewelry storage device is where the base of the jewelry storage device includes a magnet. The position of the magnet in the base is preferably such that the magnetic force between the magnet in the base and the ferromagnetic element of the support provides secure removable attachment of the jewelry storage device. In a subset of these magnetic embodiments, the magnet in the jewelry storage device is housed within the base so that it is not visible when the jewelry storage device is attached to the storage support. Illustrative examples include FIG. 1 and FIG. 6C. In another subset of jewelry storage devices, the removable attachment mechanism is hook and loop type.

The invention contemplates removable attachment of a jewelry storage device to a storage support. In an embodiment of the invention, a storage support for use with a contemplated jewelry storage device is a wall, for example of a house or dorm room. A contemplated means for removable attachment of the device permits attachment directly to a wall via various methods of art, including, but not limited to a hanging support from the wall (e.g. nail, screw, hook, hook and loop-type fastener, wedged ledge or ferromagnetic paint) and a complementary hanger on the back side (e.g. center or top of the back side) of the base (e.g. loop- or clip-type hanger, complementary portion of hook and loop-type fastener or wedged ledge, or a magnet).

A related contemplated means for removable attachment of a jewelry storage device to a wall involves an intermediate storage support capable of removable attachment to one or more of a contemplated jewelry storage device. In such a fastening system, a contemplated storage support is permanently affixed to a substantially vertical surface (e.g. by nailing, screwing, or load bearing semi-permanent adhesive such as 3M Command™), and a removable partner portion of the fastening system is affixed to the base (or formed by the base) of a contemplated jewelry storage device. In one embodiment of such an intermediate storage support is a magnetic board or a rail attached to a wall or cabinet or other substantially vertical surface. One or more jewelry storage devices are removably mounted thereon. For example, such a storage support is the rack 200 in FIG. 3D, FIG. 4 or FIG. 7, which could be mounted to a wall or cabinet, alternatively, a storage support could be placed without attachment on a table or countertop, as could be done with the item in FIG. 3D, FIG. 4 or FIG. 5A.

Figures 6A, 6B:
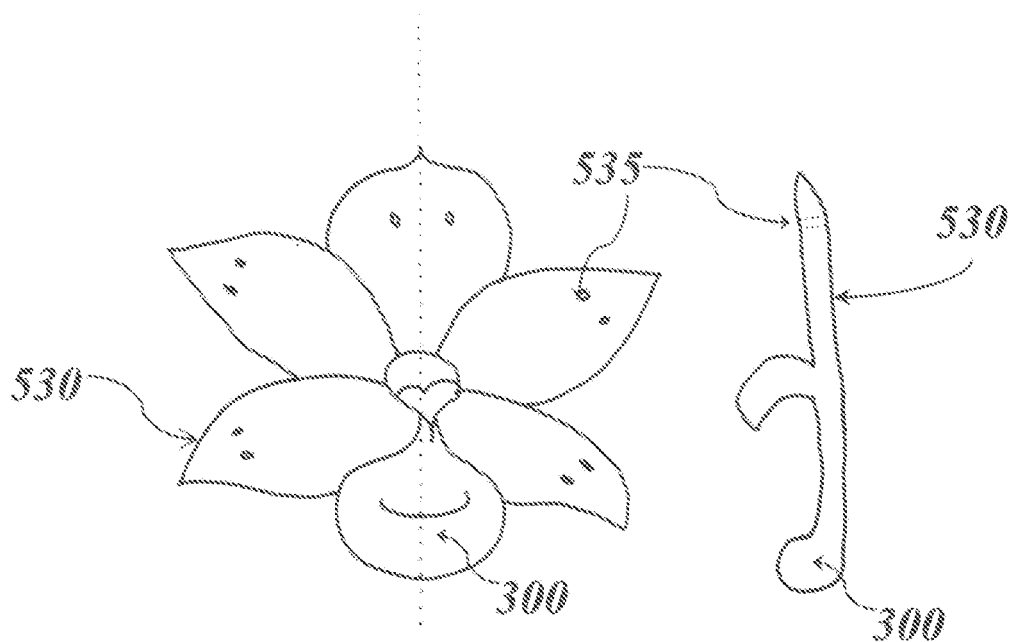
FIG. 6A is an elevational view of an orchid variation of the cover.
FIG. 6B is a sectional view along the dotted line of FIG. 6A of the same orchid cover.

In one set of contemplated embodiments, the invention has removable attachment by adhesion. An example is adhesion by magnetic forces, such as where a magnet is mounted in or on the base of a jewelry storage device, and a storage support is magnetic. Such a magnetic variation is illustrated in FIG. 1, FIG. 2, and FIG. 6. Another example is adhesion by hook and loop type fasteners or sticky tape adhesive. Such adhesive layer would be on a substantially flat back side portion of the base of a contemplated jewelry storage device.

Another set of contemplated embodiments of the invention has removable attachment via physical means, without magnetic or adhesive attraction, for example as pegs or hooks, referred to herein as insertable or hanging, see e.g. FIG. 3-5, 7. In such contemplated embodiments, a storage support has holes that are complementary to a shape that is affixed to the base or formed by the base of a contemplated jewelry storage device. For example, where a storage support is a peg board well known in the art, the base of a contemplated jewelry storage device has a hook at the top of the back of the base that hooks into the peg board. In a preferred form of this embodiment, the base has a generally planar surface that adds stability to the jewelry storage device when attached. Also contemplated with the pegboard storage support embodiment is a second protrusion beneath the hook that fits into the hole of the row beneath the hook to add further stability. Another example of a physical means of removable attachment is angled peg-like protrusions rearward from the generally flat base of a contemplated jewelry storage device, such that the peg-like protrusion may be inserted into a properly snug fitting hole of a storage support, at such a depth and angle to provide sufficient stability and ease of removing the contemplated jewelry storage device. The invention contemplates holes in such a storage support to provide ample number and spacing to suit the user's ability to store one or more of the contemplated jewelry storage devices, in a manner that maintains ease of removal and ease of viewing the displays.

Figure 4A:
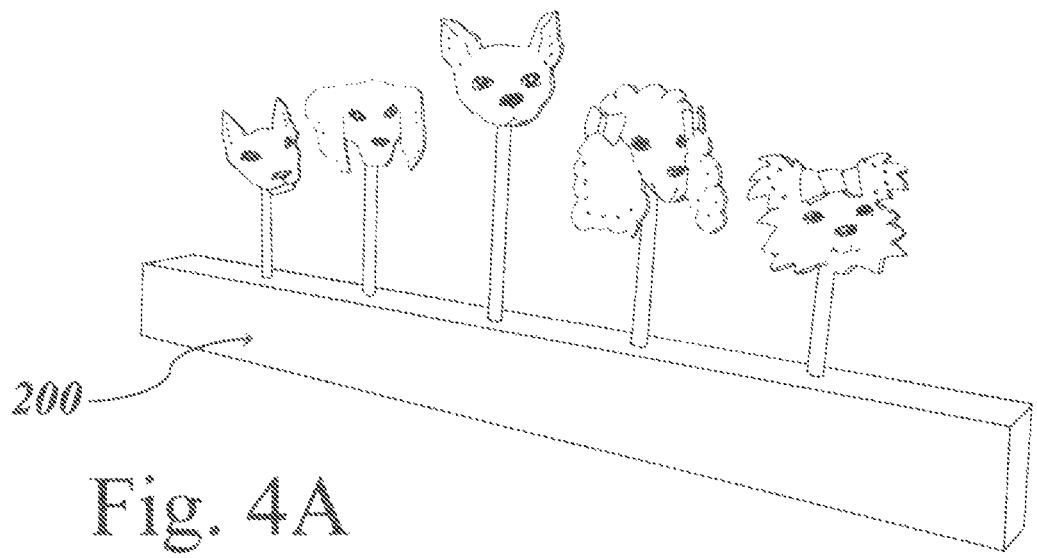
FIG. 4A shows a dog face cover variation.

The invention contemplates storage support in a variety of orientations, including vertical (e.g. mounted on a wall or piece of furniture or in a cabinet) or horizontal (e.g. on a tabletop or countertop) or diagonal, possibly providing stepped display. When storing on one storage support multiple contemplated jewelry storage devices, the invention contemplates an embodiment having a variety of stem lengths to provide varying jewelry display heights to enable ease of viewing and retrieval, as shown in FIG. 4A. Also contemplated is having varying jewelry display heights for aesthetic appeal.

The invention contemplates storing one or more jewelry storage devices of the invention on a single storage support, preferably keeping in mind that an objective of the invention is ease of grouping, viewing, storing and retrieving jewelry. The invention contemplates coordinating aesthetics between the decorative aspects of a set of jewelry storage devices, e.g. FIG. 3D, FIG. 4. The invention contemplates spacing between multiple storage devices on a single storage support in a manner that maintains accessible removal of each individual jewelry storage device. The invention contemplates a set of jewelry storage devices with coordinating relative lengths of the stem portions, such that each individual jewelry storage device may be viewed and retrieved without interference from other devices used at the same time on the same storage support, and preferably also permitting an aesthetically pleasing arrangement. Contemplated embodiments of the invention include provision of sets of coordinating contemplated storage devices for use by customers already owning suitable storage supports for those devices.

The invention contemplates jewelry storage systems that provide a contemplated jewelry storage device together with the storage support for which the device is adapted for removable attachment thereto. A contemplated embodiment is a magnetic board together with a set of aesthetically coordinating jewelry storage devices each having a base fitted with a magnet. Another contemplated embodiment is an artistic countertop display, providing the storage support, having a plurality of shaped receptacles (e.g. male shape) together with a set of aesthetically coordinating jewelry storage devices each base of which is shaped to fit into a receptacle (e.g. complementary female shape). In a simple exemplary embodiment of this type, the storage support has a plurality of ¼" holes drilled in, and the back of the base has a slightly less than ¼" diameter pin extending therefrom, the base forming a "stop" to control the level of sinking into a corresponding hole in the storage support. The lengths of the stems may be the same or may vary to provide decorative display and easily removable storage of the jewelry storage devices. A stepped display may be from multiple jewelry storage devices with the same stem lengths on a storage support with varying heights of sites for removable attachment of jewelry supports; alternatively, the stem lengths may vary to provide easy distinguishment of and access to the covers.

In another embodiment of the invention, a contemplated device storage support is a magnetic board, for example that is hung on or affixed to a wall. Such magnet boards are well known and commercially readily available to a layperson. Also contemplated as a storage support for use with this preferred embodiment of the device is a storage support that contains a ferromagnetic element, such as iron or steel (for example those found in refrigerator boxes, medicine cabinets, heat ducts). In this embodiment of the invention, a contemplated means for removable attachment of the device permits attachment to a storage support having a magnetic element by having the base of the jewelry storage device harbor a magnet. In a preferred embodiment, a magnet is affixed to the base of the device, and in a particularly preferred embodiment, a magnet is operatively encased within the base, in a manner that maintains functional contact with the storage support without detracting from the aesthetic look of the jewelry display device (e.g. FIG. 6C).

In a contemplated jewelry storage and display device, a stem region provides connection from the base to the cover. In a preferred embodiment, the stem is generally cylindrical, and the portion that connects to the base is the rear end, and the portion that connects to the cover is the face end. The orientation of the stem as it extends from the base is generally away from the back of the base, but does not have to be perpendicular relative to the general plane of the back of the base. The orientation is governed by function and decorative aspects of the jewelry storage device. For a device designed for removable attachment to a vertical storage support, a preferred embodiment of the device is generally perpendicular relative to the general plane of the back of the base. It should be appreciated that when the device is utilized for storage of, for example, an item hanging from the stem, if the stem is at an acute angle from the plane of the back of the base, such an item will still likely be sufficiently retained and remain hanging on a contemplated device, because the cover of the device has a larger area than the cross-section of the stem, as described hereinbelow. When a device according to the invention is used with a horizontal device storage support, the stem can extend from the base in a wide variety of angles and still meet the objective of ease of viewing displayed jewelry (e.g. FIG. 5). It should be noted that the invention contemplates a bendable, bent or flexible stem in addition to generally straight. The invention contemplates a device wherein the stem is optionally made of a different material than the base or the cover. In an embodiment, the stem appears to be unitary with the base, for example, when the stem is a dowel and the rear end of the stem is insertable into a hole of a device storage support (e.g. FIG. 3). In such embodiment, the base portion is the section of the stem that removably attaches to the storage support, and may optionally include a stop bulge that prevents the base from slipping further into or through the storage support, but in this case, does not flange out to form an intersecting planar base because the rest of the base is inserted. See e.g. FIG. 5A and the right-most device in FIG. 3D.

The length of the stem is functional as well as decorative. One of the functions of the stem is to provide ease of removing the jewelry display device from the storage support. In such preferred embodiments, the stem length, l, is at least 0.5 cm. This stem length provides a distance from the storage support of the cover sufficient to permit fingers to get easily behind the cover and remove the base from the storage support. Examples of l are shown in FIGS. 1A, 3, 5A, 6C and 7C. Grabbing the cover to remove a contemplated jewelry storage device is possible, but less preferred. For functional purposes of easily removing a contemplated jewelry display device from the support, a stem length longer than the width of a hand, i.e. longer than 10 cm, is less preferred. For many embodiments of the invention, a stem length of not more than that comfortably necessary for removal by a thumb and two fingers is not functionally required, thus a preferred embodiment has a stem length of not more than 5 cm for functional purposes of ease of removal.

Another function of the stem is to provide additional jewelry or fashion accessory storage. In order to store a single necklace, the stem need be no longer than that already required for getting fingertips behind the cover, i.e. at least about 0.5 cm. An embodiment contemplating additional storage on the stem of bulky bracelets, head bands, scarves, bows or ties would preferably be at least 3 cm stem length, but still preferably less than 10 cm for stability and ease of removal of items.

Also contemplated as variants of the present invention is where the stem from the base to the cover is bent, curved, wiry or flexible. In such flexible embodiments, a worker of ordinary skill in the art can select suitable materials that provide desired support while also providing desired flexibility, such as a wire coil. For example, in an embodiment, the stem is constructed from a wire coil, such that when the cover is bumped, it may move or sway, but not break or get knocked off of the holding support. A useful application of the bent, curved or wiry embodiments is, for example, as design aesthetic dictates, such as a case where the cover is an artistic interpretation of a flower, and the stem artistically serves the role of a stem. In an exemplary wiry or flexible embodiment, the user is able to flex the stems for multiple storage devices, for example stored on the same storage support, in a manner that provides a more attractive display, or to minimize interference between various pieces of jewelry stored thereupon, or for easier access to the various removable storage devices. In such wiry or flexible embodiments, a worker of ordinary skill in the art can select suitable materials, typically a flexible wire of gauge to provide the desired responsiveness, typically the artistic design of such a jewelry storage device could either have the wire exposed (possibly coated with paint or water-resistant coating), or could be coated with a flexible material, such as a flexible plastic, foam or cloth sleeve of a coordinating color that also might provide additional comfort, texture or tactile effect.

In a contemplated embodiment, the stem is considered generally cylindrical. In a preferred embodiment, the stem is of a smaller cross-sectional area than the corresponding area of the generally planar cover. The functional reason for this is to permit physical access to the region behind the cover to facilitate removal of a piercing jewelry backing during use of a contemplated jewelry storage device. To meet the objective of access to the back of a stored piece of piercing jewelry, a preferred embodiment provides at least about 0.5 cm distance between the outside edge of the stem at its closest approach to an opening for piercing jewelry storage, more preferably at least about 1 cm. In an embodiment providing storage of ear cuff jewelry pieces on the stem, a stem cross-sectional diameter of about 2 to 6 mm is preferred. In one embodiment of the stem being used for ear cuff storage an oval stem cross-section is also contemplated, where the oval cross section short axis is 2 to 5 mm and the long axis is 4 to 8 mm.

A contemplated jewelry storage device has a cover portion that has at least one opening for holding piercing jewelry. For typical piercing, non-gauge-type jewelry, a plurality of openings is preferred, preferably 2 to 20 openings, most preferably 4 to 10 openings. The ideal number of openings is mindful of ease of access to the stored jewelry, and the shape and size of the particular jewelry storage device. The opening is intended for use for the storage of piercing-type jewelry. For a typical post-type earring, the required area of the opening is at least about a square millimeter, a circular opening being an aperture. A larger opening is also useful for storing piercing type earrings. In a preferred embodiment for a post-type earring, the opening is not so large that a post-type earring front stud or earring backing will be able to pass all the way through the opening instead of being retained, thus for this embodiment, preferably smaller than about 9 square millimeters, essentially a 3 mm diameter circular or 3 mm side square cross-sectional opening area. Openings for earring retention include mesh, slits, round apertures (those ranging in size from 2 to 11 mm diameter referred to herein as gauge apertures), and keyhole-shaped apertures. Slits may also be wide enough to accommodate gauge jewelry.

In many examples of the art for storage of piercing jewelry, a mesh, such as a metal screen or open-weave fabric, are used to mount piercing jewelry through. A cover with these type of openings are referred to herein as "mesh", as distinguished from "aperture". An artful, closely repetitive decorative metal or plastic design approaches a "mesh".

For hoop earrings and wire hook earrings, an opening can be larger while the earring will remain held by the holder during movement. It is generally understood in the art that a notched low point, the earring will be retained on the holder. Also contemplated are slits preferable having a width of less than the size of a typical post earring backing, so less than 5 mm wide, preferably about 3 mm wide or less. The user is able to store a wide variety of earring types on a slit open towards the top, including posts, wires and hoops. In the case of posts, being stored in slit openings or keyhole-type openings, the earring backing does not need to be removed, and the earring can be poked through the wide part of the keyhole and slid down the narrow part of the keyhole, or merely slid down the slit-shaped portion of the keyhole and retained. A keyhole-type opening is a specific type of "aperture". An open slit is a type of "opening".

Thickness of the cover of a contemplated jewelry storage device. In a preferred embodiment, the cover is not thicker than an earlobe (about 6 mm) in the region where an earring is stored. Preferably, the thickness of the cover of a contemplated storage device ranges from about 0.5 mm to about 6 mm. In many embodiments, such as where the jewelry storage device is constructed from a sheet of metal or plastic, the cover is only about 1 mm thick. In other embodiments, such as where the jewelry storage device is constructed from cast metal or plastic resin, the cover is preferably from about 1 mm to about 4 mm thick.

In an alternative contemplated embodiment, the cover is constructed from a flexible substrate, such as a rubber, preferably silicone-containing to maintain smooth flexion and useful lifespan in warm environments. One subset of a rubber embodiment further contemplates an attractive scent being incorporated, for non-limiting example, a flower, food, spice, or baby powder scent. This embodiment is particularly useful for storing ear-shaped model earring holders, especially for full ear styled multi-pierced designs and gauges.

For a gauge-type earring, a flexible substrate cover as described above is preferred. In gauge storage embodiments, the width of the opening (or diameter of an aperture type opening) is equal to or slightly smaller than the size of the gauge being stored, and the thickness of the cover is in the slightly thicker cover range of 2 mm to 6 mm. The invention contemplates a single opening in the cover for storing a gauge, but also embodiments that can store multiple gauges, preferably from one to six gauges on a single storage device, as informed by the functional aspect of ease of accessibility and uncluttered viewing of stored jewelry. Gauges range in diameter from 18 g at 1 mm, 16 g at 1.3 mm, 8 g at 3 mm, 4 g at 5 mm, 0 g at 8 mm, and 00 g at 9 mm.

Example 1. Modern Style Magnetic Jewelry Storage and Display Device

An example of this type is illustrated in FIG. 1. A jewelry storage device 500 constructed as a single cast aluminum piece has a 2 cm diameter round base 540 section 0.5 cm thick, housing a high-strength magnet 545 permanently embedded. From the base section extends perpendicularly a stem 520, 0.5 cm diameter round cylindrical stem and 1.5 cm long (l, the length of the stem), supporting the cover. In one example, the cover 530 is round, 5 cm diameter 3 mm thick, and has two apertures 535 to support a pair of earrings. The cover has a larger diameter than the stem and the base to permit easy access to remove the backings of the stored earrings. In the drawing, the distance, d, is the distance between the stem and opening. In a related example, the cover has eight apertures 535 around the circumference of the circle to hold four pair of earrings. In another related example, the cover has six pairs of holes around the perimeter, to hold six pair of earrings.

Example 2. Flower-Shaped Magnetic Jewelry Storage and Display Device

A jewelry storage device is constructed from cast aluminum. It has a 2 cm diameter round base section housing a medium strength magnet, a stem 3 cm long with a cross-sectional area of about 0.9 cm. The device also has a cover that is a six-petaled flower with an approximate diameter of about 5 cm if a circle circumscribed the flower. An example of such a cover 530 is shown in FIG. 3D. Each petal has an aperture 535 near the tip, so that the flower holds three pair of earrings. In a related embodiment, the cover is a six-petaled flower with an approximate diameter of about 6 cm, and each petal has two apertures near the tip, 1 cm apart, so that the flower hold 6 pair of earrings, and a user could put one pair on each petal.

In a related embodiment, the base and stem are constructed of metal, and the cover is constructed of painted wood. In a related embodiment, the jewelry storage device is constructed from wood. In a related embodiment, the jewelry storage device is constructed of cast resin.

In the above magnetic examples, a jewelry device support is a vertical magnetic surface.

In a related embodiment, instead of the base housing a magnet, the rear of the base is flat and permanently adhered to the hook material of a hook and loop fastener. The loop material of a hook and loop fastener is the surface of a vertically-mounted jewelry device support.

Figure 2B:
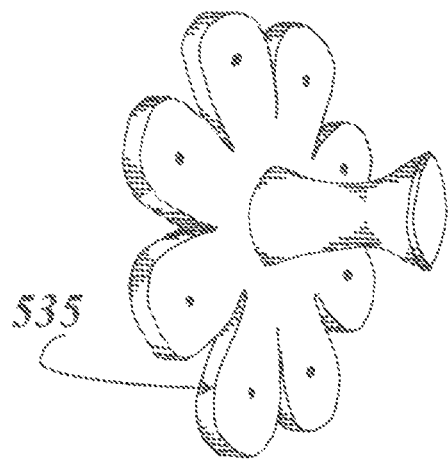
FIG. 2B is a rear elevational side view showing apertures 535 for most post and wire piercing earrings.

FIG. 2 illustrates examples of floral design jewelry storage and display devices. The flowers of FIGS. 2A and 2B are wooden, with standard sized 1 mm apertures 535 for typical earring insertion. The means for removable attachment of the device to a storage support in this example is adhesion, such as a magnet or hook and loop attachment on the substantially flat base.

Figure 2C:
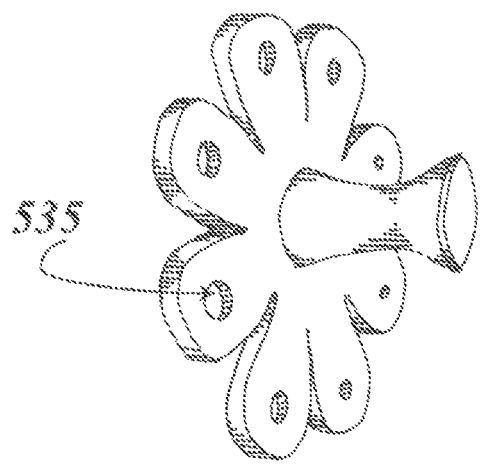
FIG. 2C is a rear elevational side view showing a variation of aperture 535 sizes to accommodate larger "gauge" piercing jewelry.

The example in FIG. 2C shows a version of the device adapted for use with gauge piercing jewelry by using the appropriate size aperture 535 ranging from 1 to 7 mm. The cover is constructed out of a slightly flexible plastic for ease in inserting and removing such gauge jewelry.

Example 3. Insertable Jewelry Storage and Display Device

Figures 3A, 3B, 3C:
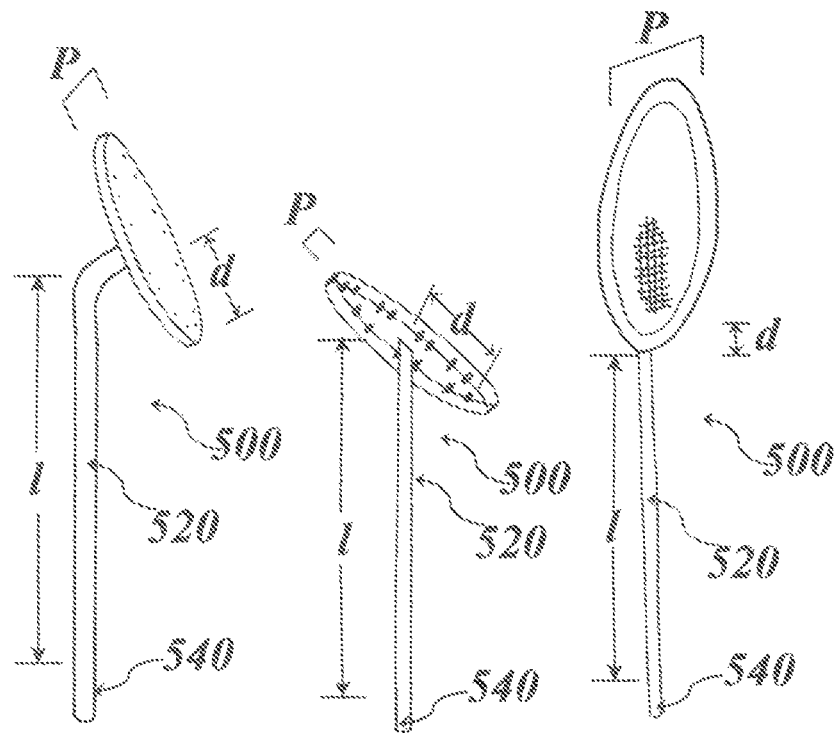
FIG. 3A has a bent stem and a streamlined cover.
FIG. 3B is a clear cover mounted on the stem at an angle.
FIG. 3C is a mesh cover.
Figure 3D:
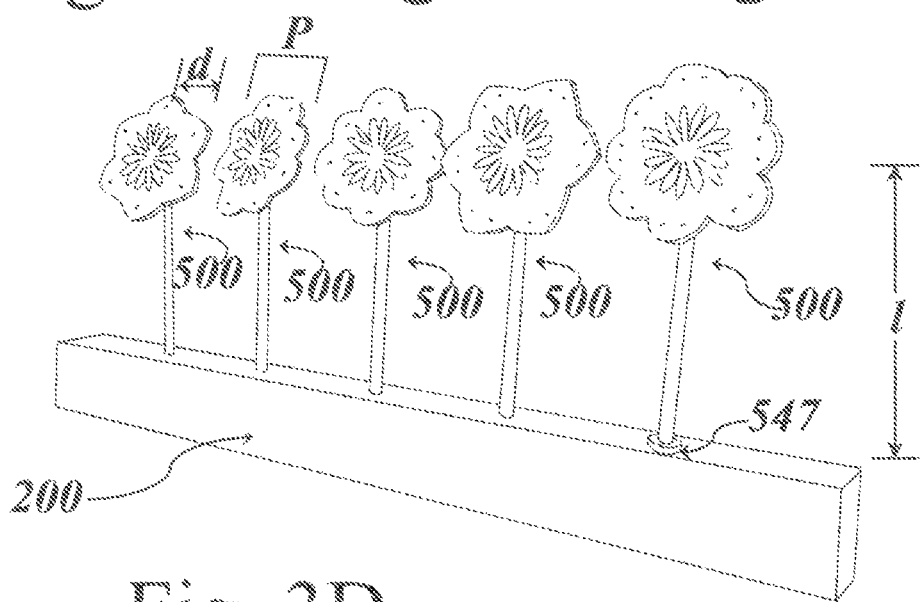
FIG. 3D shows multiple removable jewelry storage devices on a single device support.

FIG. 3 illustrates examples of jewelry storage and display devices 500 where the means for removable attachment to a storage support is insertion of the base 540 of the device into a storage support 200. In FIG. 3A, the cover 530 is mounted on a bent stem 520 for an alternative angle of display. In this example, the entire jewelry storage device is wood, metal, or plastic. In FIG. 3B, the cover 530 is made from a clear material, such as plastic, glass or acrylic, and is mounted on the stem 520 at a diagonal for an alternative angle of display. In FIG. 3C, a mesh variation of a jewelry storage and display device is illustrated, most conveniently made from metal. The cover 530 is mesh through which piercing jewelry can be inserted at any location across the mesh, rather than only a limited choice of openings. In this example, the stem 530 is mounted coplanar with the general plane of the cover, rather than perpendicularly as in FIG. 3A or at an angle as in FIG. 3B. In this case, because it is a mesh, the distance d to the stem is only the distance across the width of the frame.

FIG. 3 illustrates how to apply the stem length, l, and the stem to opening distance, d, in various embodiments. An angled line, denoted P, shows the general plane of the cover, as described herein.

At the far right in FIG. 3, a flange 547 is incorporated on the stem of the flower. This flange 547 sets the height at which the stem can be inserted into the support rack 200. It is also convenient for providing a demarcation from where the "stem" ends and the "base" begins in this type of embodiment. Further, the flange provides lateral stability.

Example 4. Dog or Cat-Shaped Jewelry Storage and Display Device

FIG. 4A shows a rack-type storage support 200 holding five insertable jewelry storage devices where the covers are shaped and colored in the decorative theme of dogs. In the drawing, the stem lengths are varied to provide ease of grasping a particular jewelry storage device in a pleasing display. In an alternative example, the storage support rack is chevron-shaped so that the five jewelry storage devices would be at varying heights although their stem lengths are the identical.

Figure 4B:
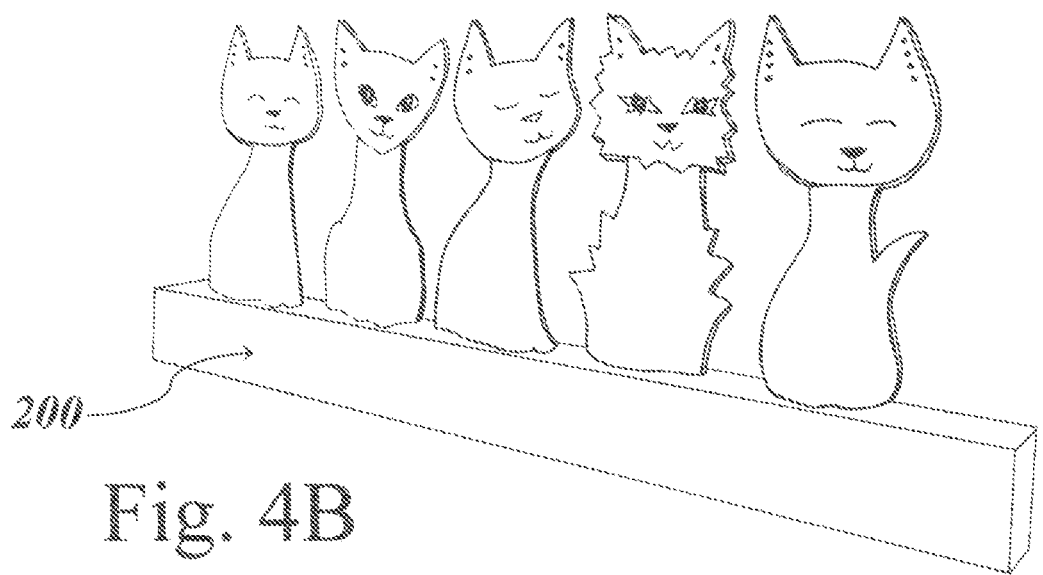
FIG. 4B shows a cat cover variation with stem body variation.

FIG. 4B shows a rack-type storage support 200, holding five insertable jewelry storage devices where the covers are shaped and colored in the decorative theme of cats. In the drawing, the jewelry storage device stems are camouflaged with cat bodies for added aesthetic appeal.

In alternative examples, the dog or cat covers are on stem and base substantially as shown in FIG. 1.

Example 5. Daffodil-Shaped Insertable Jewelry Storage and Display Device

Figures 5A, 5B:
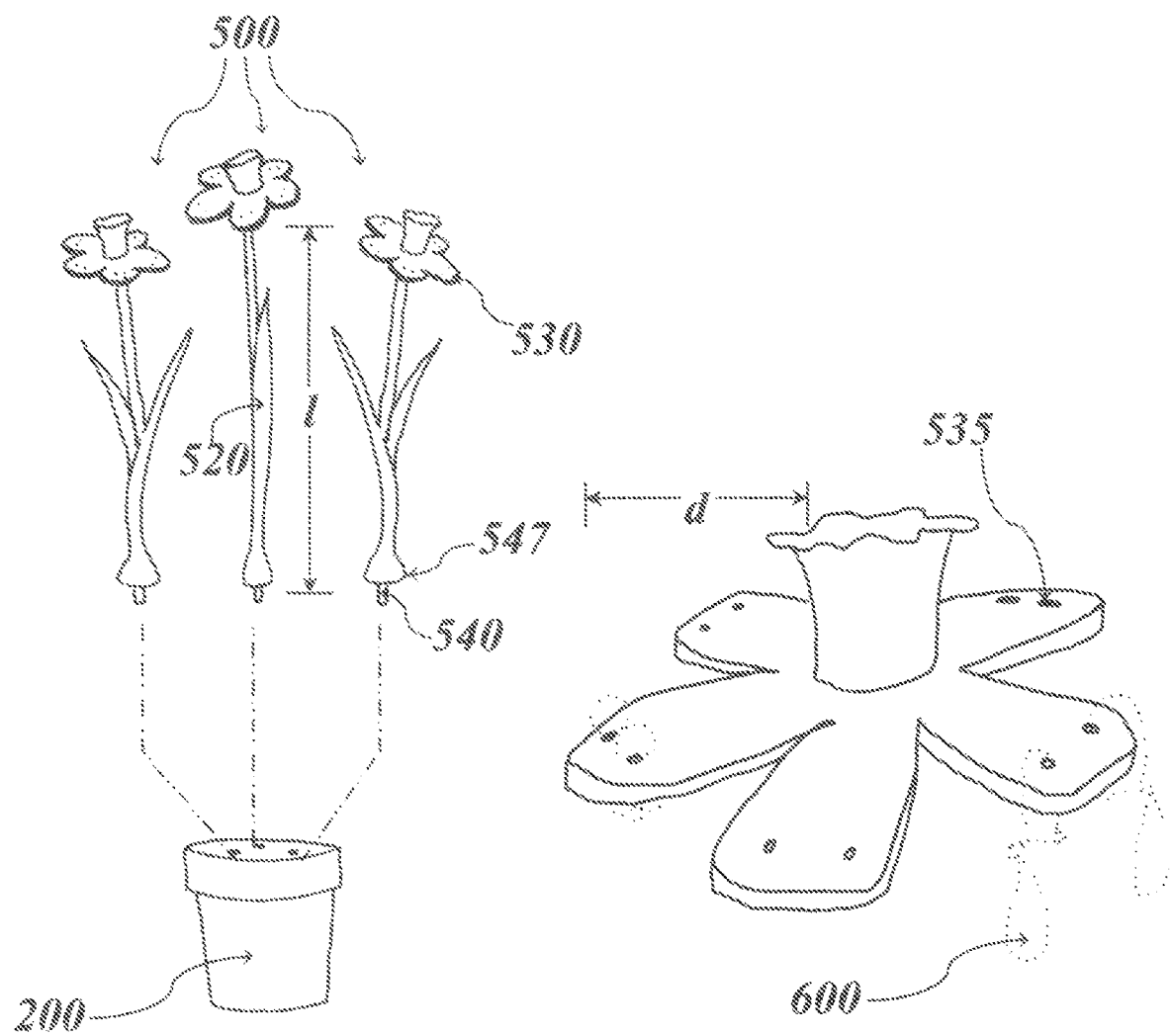
FIG. 5A is an elevational view showing three removable jewelry storage devices 500 as they may insert into a storage support 200.
FIG. 5B shows a contemplated jewelry storage device cover 530 as used with post and wire piercing earrings 600 (depicted in dotted lines).

A version of this example is shown in FIG. 5. A jewelry storage device has a stem 520 constructed of wood, which has a length l, and a flare 535 at the rear end of the stem which provides a stop for insertion of a dowel-shaped base 540 into a horizontal jewelry device support 200. In this example, the jewelry device support has the appearance of a flower pot, and its upper surface (which has the appearance of flowerpot soil, optionally with moss for style) has multiple drilled-in or formed holes for supporting multiple jewelry storage devices. As depicted in FIG. 5A, the diameter of the drilled holes is comfortably larger than the dowel-shaped base of the jewelry storage device, and of a depth sufficient to accommodate the full length of the base extension, where that length provides support against wobbling and tipping of a laden, stored jewelry storage daffodil. The bulb flare adds to the stability of the stored device. FIG. 5B shows the daffodil petals with apertures being used to store a pair of studs at the left and a pair of wire drop earrings 600 at the right. FIG. 5B shows the distance d from the flute/stem to the opening for ease of manipulation of stored earrings. Necklaces can optionally be draped over the flutes of the daffodil.

Example 6. Orchid-Shaped Magnetic Jewelry Storage and Display Device

A jewelry storage device has a cover constructed from plastic, and a stem made of flexible green polymer over metal wire. The base is configured for removable attachment through snug insertion into a jewelry device support which has the appearance of a pot with relatively large dark green glossy artificial orchid leaves (not shown). The cover 530 has the general appearance depicted in FIG. 6A and FIG. 6B. The plastic petals of the cover with the orchid appearance are lightly flocked for a velvety appearance and feel. The thick part of the cover of the jewelry storage device that is the curved lobe 300 of the orchid demonstrates a circumferential thickness. The size of the circumferential thickness is similar to that of a typical ear, i.e. about 5 to 7 mm. This lobe of the orchid is provided for the storage of an ear cuff. The petals of the orchid have apertures 535 for storing piercing jewelry.

Figure 6C:
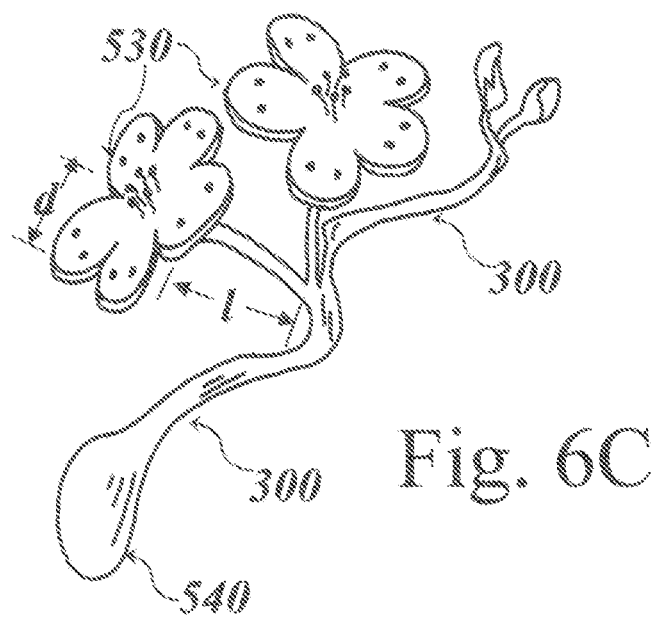
FIG. 6C is an elevational view of a cherry blossom variation of a contemplated removable storage device.

Example 7. Cherry Blossom-Shaped Magnetic Jewelry Storage and Display Device A jewelry storage device is made of plastic to have the appearance of a cherry blossom sprig, as depicted in FIG. 6C. In this example, the brown, wood-look stem is injection-molded hard plastic, that has an opening at the back of the base for housing a small, high-strength magnet. The magnet portion of the base is not visible from the angle shown in FIG. 6C, and it would not be visible in practice when the magnetic removable jewelry storage device is mounted on a ferrometallic vertical surface. The stem is bent artistically but still functionally creates distance from the base for ease of handling. The cross-sectional diameter of the stem varies artistically to approximate a natural appearance of a cherry tree sprig, but the diameter is sufficient in parts of the stem 300 to reliably store ear cuff jewelry. Also, necklaces may be draped on the "branch". In this example, the end of the cherry sprig has buds as shown in FIG. 6C, which are not positioned in a manner to interfere with access to the stored piercing jewelry, but may assist in retaining stored necklaces and cuffs. The cherry blossoms and buds themselves are constructed of flocked plastic and tinted for realistic interpretations. There are apertures in the cherry blossom petals for storing piercing jewelry.

FIG. 6C also illustrates how to apply the stem length, l, and the stem to opening distance, d, in the cherry blossom multi-cover embodiment.

Example 8. Jewelry Storage Devices Hooked on an Adhesive Rack

Figure 7A:
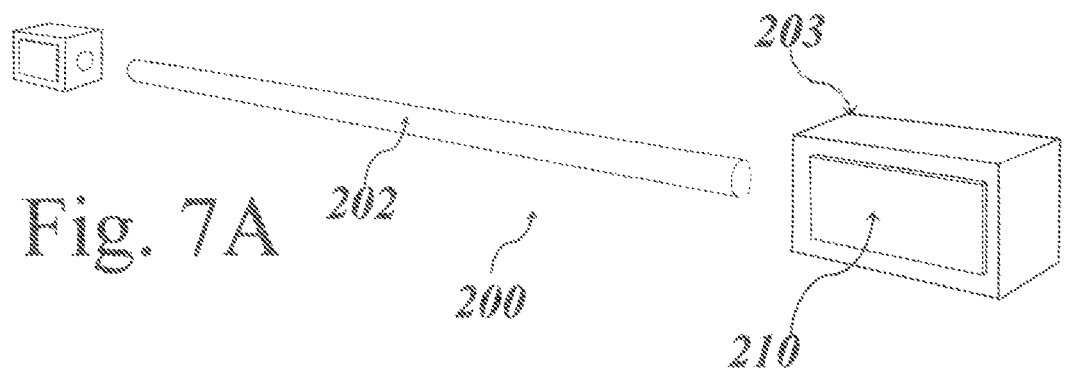
FIG. 7A is a partially exploded view of rod-type rack storage support showing detachable ends 203 (with adhesive 210) and the cross bar rod 202.
Figure 7B:
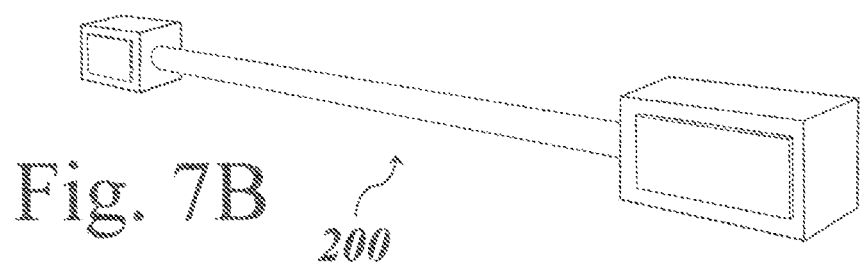
FIG. 7B is the support 200 with adhesive 210.
Figure 7C:
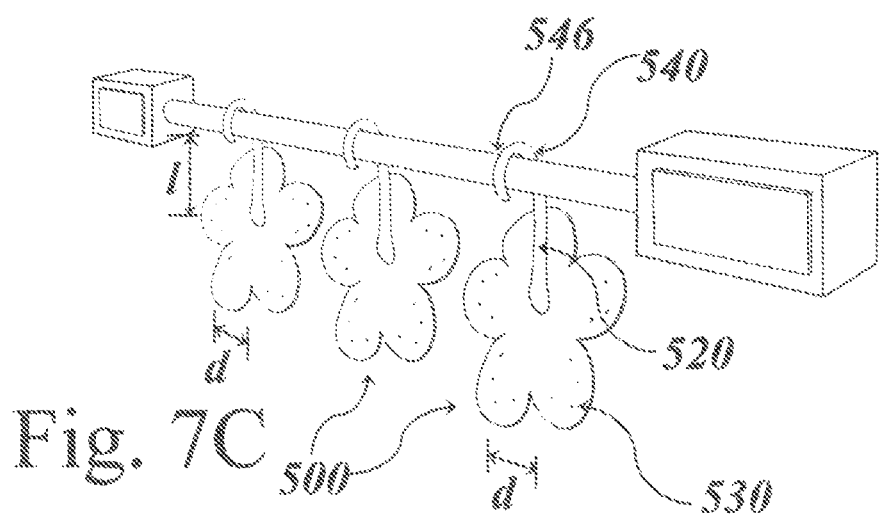
FIG. 7C shows a hook variation of a contemplated removable jewelry storage device, three on one support.

FIG. 7 depicts multiple jewelry storage devices hooked on an adhesive rack. In an embodiment for hanging storage of multiple jewelry storage devices, the cover 530 of a contemplated jewelry device is supported by a stem 520. The base 540 forms a hook 546 for removable attachment to the rod 202 on the storage support 200. The length of the stem, l, from the base to the part of the cover that has apertures for storing earrings is shown in FIG. 7C has to be long enough to easily remove the hook from the rack without disturbing the stored earrings. In the drawing, the rack is a curved rod and the hook is also curved. In a related contemplated example, the rack is a rectangular cross-section of straight cut wood slat, rather than a turned rod; and the corresponding hook has squared turns, instead of a curve.

The storage support 200 is formed at the site with two separate rod-support ends 203, each having a hole for insertion of the end of the rod 202 to be supported. On one side of each rod-support end 203 is an adhesive 210. The adhesive is used to attach the storage support to another structure.

In one example, the adhesive 210 is a magnet, and the storage support rack is formed on a ferromagnetic board or cabinet. In another example, the adhesive 210 is a glue-type and is mounted directly to a wall or cabinet.

The flower-shaped cover in one of these examples is made of leather. Alternatively, the cover is plastic, polymer, or wood.

Example 9. Jewelry Storage Device with Circumferential Thickness and Radial Curve In an embodiment for storage of sets of ear jewelry that coordinate, the cover of a contemplated jewelry device has a circumferential thickness about 5 mm about 7 mm in diameter which then drops off, thinning toward the cover's center to a cover thickness of 2 mm. The sections with the circumferential thickness have a radial curve of approximately 2 cm, and is loosely shaped like a stylized ear. For complex ear stylings for multiple piercings, the ear-shaped cover is constructed from a sturdy, soft, flexible material, such as silicone. Such a silicone ear can be pierced by the end user to have similar piercings as their own ear. In this manner, a contemplated storage device can be used to display the pierced jewelry together that could be worn together. An advantage to the ear-shaped device is that jewelry, such as ear cuffs or wraps, can be stored and displayed together with the post- or stud-type earrings with which they coordinate.

Example 10. Flexible Storage Device

Another piercing type of jewelry that can be stored on a flexible jewelry storage device is a gauge. Apertures just slightly smaller in diameter than the diameter of the gauge jewelry to be stored are provided, extending all of the way through the flexible jewelry storage device. According to the present invention, a 2 cm stem extends from the center back of the flexible jewelry storage device cast as one with a base for housing a magnet. The silicone is flexible enough to permit the gauge to be inserted. In such embodiment, it is contemplated that the base and stem be made out of a less flexible material than silicone, such as hardened molded plastic.

In a related gauge storage example, standard stud earring-sized apertures are provided, and the gauge openings have a thin backing on their holes that keep them from falling through the back of the jewelry storage device.

Specific embodiments of the novel device for the storage and display of jewelry according to the present invention has been described for the purposes of illustrating the manner in which the invention may be made and used. It should be understood that implementation of other variations and modifications of the invention in its various aspects will be apparent to those skilled in the art, and that the invention is not limited by the specific embodiments described herein. It is therefore contemplated to cover by the present invention any and all modifications, variations, or equivalents that fall within the true spirit and scope of the basic underlying principles disclosed and claimed herein. Thus, where the contemplated recitations of art described herein as examples for use in combination with the present invention, those of examples are intended as non-limiting examples.

What is claimed is:

1. A jewelry storage device for attachment to a storage support for the storage and display of jewelry comprising:
   a base having a back side and a stem side, said base comprising a means for removable attachment, wherein said means for removable attachment comprises said base comprising an operatively connected magnet, wherein said operatively connected magnet is housed with the base so that it is not visible when the jewelry storage device is attached to the storage support, and wherein the back side of said base is generally planar, and wherein the base is round such that the shape of said base in a base plane is a circle having a radius r;
   a generally cylindrical stem extending from the stem side of the base, said stem having a length of at least 0.5 cm, said stem having a rear end and a face end, wherein the rear end of the stem connects to the base, and the face end of the stem is generally away from the base;
   a generally planar cover connected to the face end of the stem, wherein said cover comprises at least two openings passing through the plane of the generally planar cover, each opening having an area of at least about 1 square mm, and wherein the distance between the center of said stem where it attaches to the cover and each of said openings in the cover is the distance, d, and wherein said distance, d, of the cover is larger than the radius r of said base.

2. The jewelry storage device of claim 1 wherein the stem has a length of about 1 cm to about 5 cm.

3. The jewelry storage device of claim 1 wherein the cover comprises a number of openings that is eight or less.

4. A jewelry storage device for attachment to a storage support for the storage and display of jewelry comprising:
   a base having a back side and a stem side, said base comprising a means for removable attachment wherein said means for removable attachment comprises said base comprising an operatively connected magnet housed within the base so that it is not visible when the jewelry storage device is attached to the storage support, and wherein the back side of said base is generally planar;
   a generally cylindrical stem extending from the stem side of the base, said stem having a length of at least 0.5 cm, said stem having a rear end a face end, wherein the rear end of the stem connects to the base, and the face end of the stem is generally away from the base, and wherein the stem has an hourglass shape wherein said stem is wider at its rear end and its face end while smoothly transitioned to a narrower width toward the midlength of said stem;
   a generally planar cover connected to the face end of the stem, wherein said cover comprises at least two openings passing through the plane of the generally planar cover, each opening having an area of at least about 1 square mm; and wherein the diameter of the cover is larger than the diameter of the base.

5. The jewelry storage device of claim 4 wherein the stem has a length of about 1 cm to about 5 cm.

6. The jewelry storage device of claim 4 wherein said cover comprises a number of openings that is eight or less.

* * * * *